(12) United States Patent
Zhang

(10) Patent No.: US 9,352,617 B2
(45) Date of Patent: May 31, 2016

(54) HOLLOWED NON-PNEUMATIC TYRE WITH REINFORCING RIBS

(71) Applicant: GUANGZHOU NAIDONG INFORMATION TECHNOLOGY CO. LIMITED, Guangzhou (CN)

(72) Inventor: Chunru Zhang, Guangzhou (CN)

(73) Assignee: GUANGZHOU NAIDONG INFORMATION TECHNOLOGY CO. LIMITED, Guangzhou (CN)

( * ) Notice: Subject to any disclaimer, the term of this patent is extended or adjusted under 35 U.S.C. 154(b) by 18 days.

(21) Appl. No.: 14/388,787

(22) PCT Filed: Feb. 28, 2013

(86) PCT No.: PCT/CN2013/000201
§ 371 (c)(1),
(2) Date: Sep. 26, 2014

(87) PCT Pub. No.: WO2014/113904
PCT Pub. Date: Jul. 31, 2014

(65) Prior Publication Data
US 2015/0059944 A1    Mar. 5, 2015

(30) Foreign Application Priority Data
Jan. 23, 2013    (CN) .......................... 2013 1 0024292

(51) Int. Cl.
*B60C 7/10* (2006.01)
*B60C 7/22* (2006.01)

(52) U.S. Cl.
CPC ... *B60C 7/10* (2013.01); *B60C 7/22* (2013.01); *B60C 2007/107* (2013.04); *B60C 2200/10* (2013.04); *B60C 2200/12* (2013.04)

(58) Field of Classification Search
CPC .......... B60C 7/10; B60C 7/102; B60C 7/105; B60C 7/14; B60C 7/143; B60C 7/22; B60C 2007/107; B60C 2007/146; B60C 2200/10; B60C 2200/12

USPC .......... 152/323, 324, 325, 326, 327, 328, 329
See application file for complete search history.

(56) References Cited

U.S. PATENT DOCUMENTS

| | | | | |
|---|---|---|---|---|
| 1,624,856 | A * | 4/1927 | Bauman | B60C 7/14 152/247 |
| 5,343,916 | A * | 9/1994 | Duddey | B60C 7/12 152/326 |
| 8,517,068 | B2 * | 8/2013 | Delfino | B60C 7/18 152/11 |
| 8,770,243 | B2 * | 7/2014 | Lee | B60C 7/105 152/379.3 |
| 2010/0212797 | A1 * | 8/2010 | Eaton | B29D 30/02 152/301 |

OTHER PUBLICATIONS

Mechanical translation of WO2011/049407, Jeon, Apr. 28, 2011.*

* cited by examiner

*Primary Examiner* — John Walters
(74) *Attorney, Agent, or Firm* — CBM Patent Counsulting, LLC

(57) ABSTRACT

A hollowed-out non-pneumatic tire with reinforcing ribs comprises a tire body. A row or rows of through holes are uniformly and annularly distributed in the tire body. The through holes are uniformly distributed in the tire body in 360 degrees by taking the central axis of the tire body as a center. The through holes transversely penetrate through the two sides of the tire body. The reinforcing ribs are arranged in the through holes. The hollowed-out non-pneumatic tire with the reinforcing ribs provided by the invention has the advantages that the elasticity is high, the friction area between the tire and the ground is reduced and the driving force of the bicycles, the motorcycles and the automobiles is effectively decreased.

4 Claims, 3 Drawing Sheets

Figure 5:
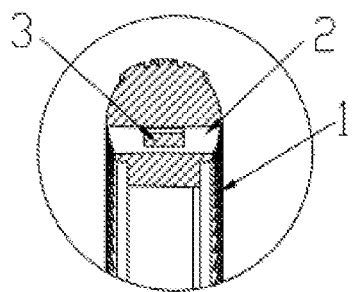

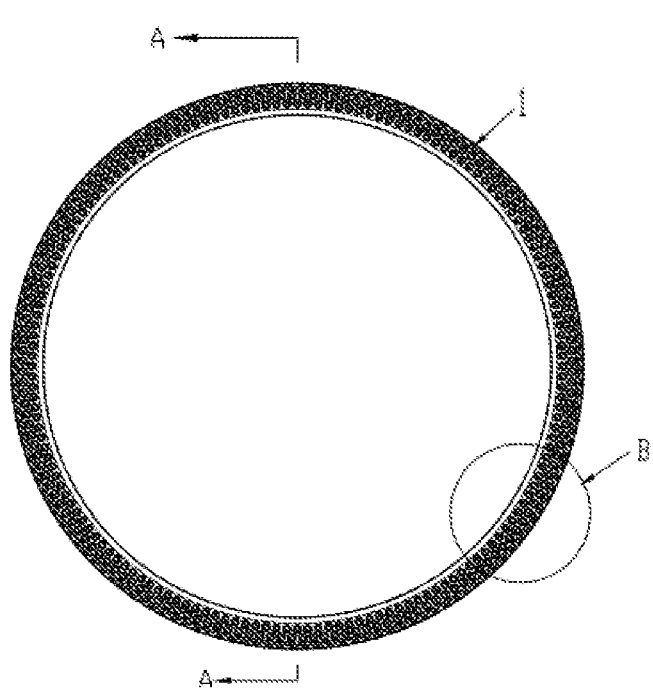
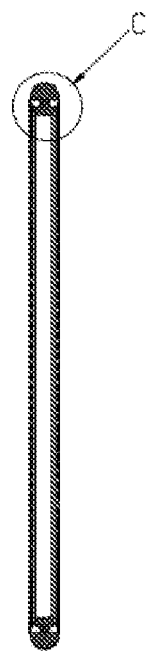
FIG. 1  FIG. 2
FIG. 3
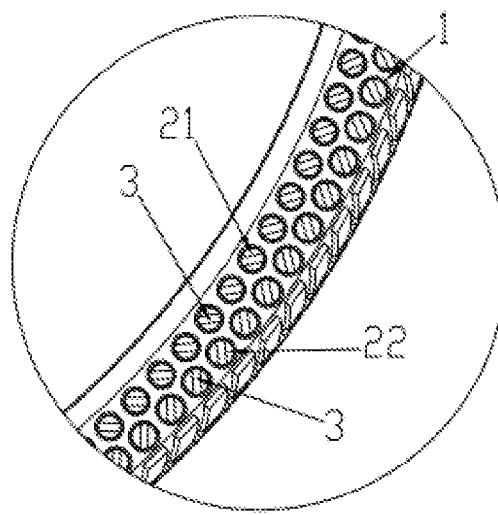
FIG. 4

HOLLOWED NON-PNEUMATIC TYRE WITH REINFORCING RIBS

This application is the U.S. national phase of International Application No. PCT/CN2013/000201 Filed on 28 Feb. 2013 which designated the U.S. and claims priority to Chinese Application No. CN201310024292 filed on 23 Jan. 2013, the entire contents of each of which are hereby incorporated by reference.

FIELD OF THE INVENTION

The invention relates to an automobile tire, in particular to a non-pneumatic tire for bicycles, motorcycles, automobiles and the like.

BACKGROUND OF THE INVENTION

At present, the existing non-pneumatic tires are realized by adopting different methods such as filling elastic soft objects in the tires, adding reinforcing ribs in the tires and arranging through holes in the tires. For example, a non-pneumatic tire which is disclosed by the invention with the patent number '200810090158.7' in China realizes a shock absorbing function mainly through a reinforced ring belt and a plurality of connecting spokes which are connected together; the non-pneumatic tire with the structure has the disadvantages that the tire is complex to manufacture, the cost is high and the quality is difficult to guarantee. As another example, a non-pneumatic tire with an arch-shaped cavity, which is disclosed by the invention with the patent number '200910073699.3' in China, realizes a shock absorbing function mainly through an S-shaped chamber in the tire and a positioning arch bridge which is connected with the S-shaped chamber; the non-pneumatic tire with the structure has the disadvantage that the tire is difficult to install, use and popularize.

SUMMARY OF THE INVENTION

The invention provides a non-pneumatic tire which has a simple structure, is convenient to install and has good shock absorbing performance, aiming at overcoming the disadvantages of the existing non-pneumatic tires.

A hollowed-out non-pneumatic tire with reinforcing ribs comprises a tire body. A row or rows of through holes are uniformly and annularly distributed in the tire body. The through holes are uniformly distributed in the tire body in 360 degrees by taking the central axis of the tire body as a center. The through holes transversely penetrate through the two sides of the tire body.

The reinforcing ribs are arranged in the through holes.

The reinforcing ribs are elastic pieces which are connected with the two sides of the through holes.

The reinforcing ribs are arranged at the positions of the middle sections of the through holes.

The length of the reinforcing ribs is equal to the length of the through holes.

The through holes consist of an inner row of holes and an outer row of holes. Each hole of the inner row of holes is arranged at a corresponding position between every two holes of the outer row of holes to form an inverted-triangle structure. The reinforcing ribs in the inner row of holes and the outer row of holes are distributed at a consistent angle and in opposite directions.

The reinforcing ribs in the inner row of holes and the outer row of holes are distributed at the consistent angle and in the same direction.

The reinforcing ribs are arranged in the through holes and are in parallel with the diameter of the tire body.

BENEFICIAL EFFECTS OF THE INVENTION

Since the reinforcing ribs are arranged in the through holes of the hollowed-out non-pneumatic tire, the tire body is enabled to have higher elasticity, the friction area between the tire and the ground is reduced and the driving force of the bicycles, the motorcycles and the automobiles is effectively decreased.

BRIEF DESCRIPTION OF ACCOMPANYING DRAWINGS

Figure 6:
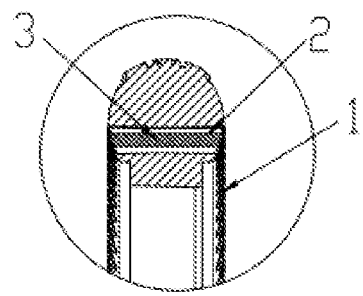
Figure 7:
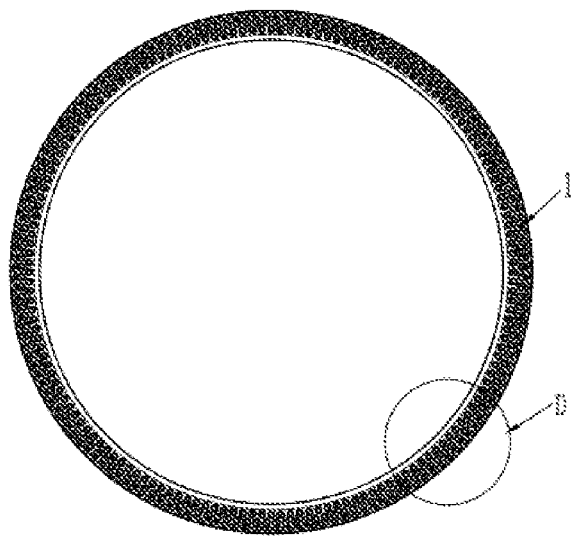
Figure 8:
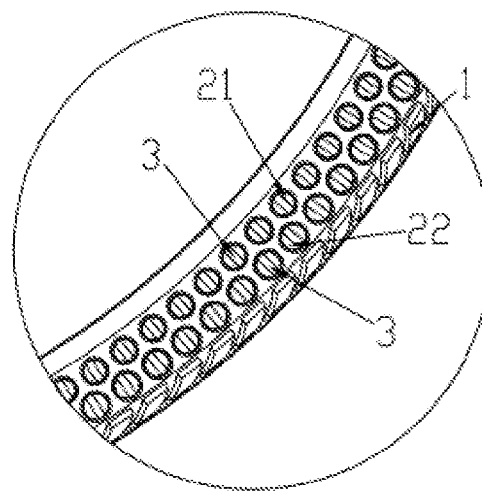
Figure 9:
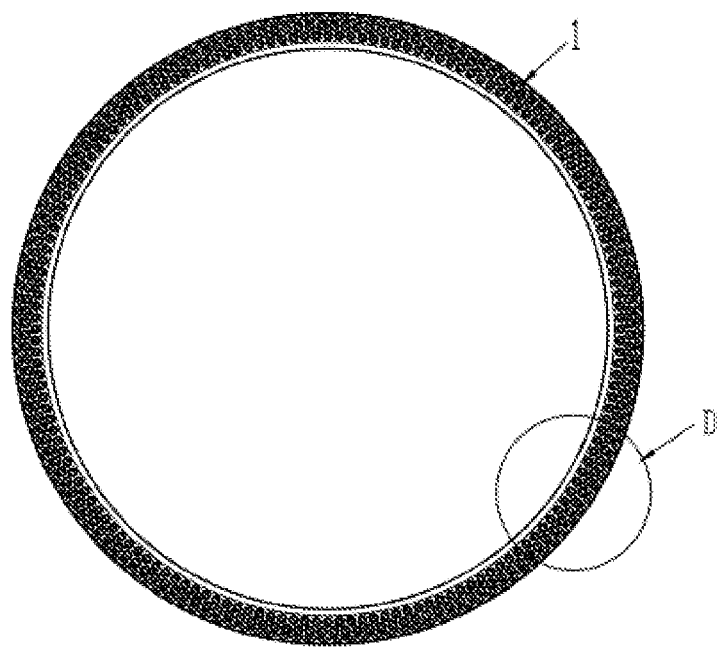
Figures 10, 11:
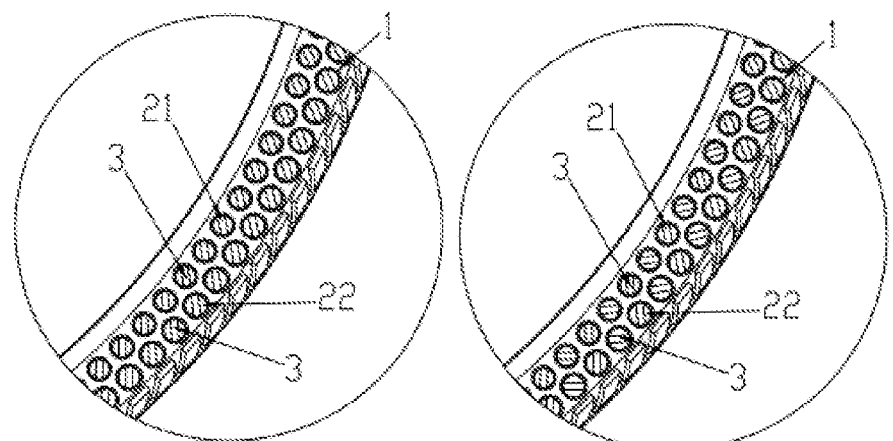

FIG. 1 is a front view of the embodiment I of the invention.
FIG. 2 is an A-A section view of the FIG. 1.
FIG. 3 is a top view of the FIG. 1.
FIG. 4 is a B enlarged schematic drawing of the FIG. 1.
FIG. 5 is a C enlarged schematic drawing of the FIG. 2.
FIG. 6 is a structural schematic drawing of the embodiment II of the invention.
FIG. 7 is a front view of the embodiment III of the invention.
FIG. 8 is a D enlarged schematic drawing of the FIG. 7.
FIG. 9 is a front view of the embodiment IV of the invention.
FIG. 10 is an E enlarged schematic drawing of the FIG. 9.
FIG. 11 is another structural schematic drawing of the FIG. 10.

DETAILED DESCRIPTION OF THE EMBODIMENTS

Embodiment I: as shown by the FIG. 1 to the FIG. 5, the hollowed-out non-pneumatic tire with the reinforcing ribs is characterized in that the hollowed-out non-pneumatic tire comprises a tire body 1; a row or rows of holes 2 are uniformly and annularly distributed in the tire body 1; the through holes 2 are uniformly distributed in the tire body in 360 degrees by taking the central axis of the tire body 1 as a center; the through holes 2 consist of an inner row of holes 21 and an outer row of holes 22; each hole of the inner row of holes 21 is arranged at a corresponding position between every two holes of the outer row of holes 22 to form an inverted-triangle structure; the through holes 2 transversely penetrate through the two sides of the tire body 1; reinforcing ribs 3 are arranged in the through holes 2; the reinforcing ribs 3 in the inner row of holes 21 and the outer row of holes 22 are distributed at a consistent angle and in opposite directions; as shown by the FIG. 4, the reinforcing ribs 3 in the inner row of holes 21 are arranged at approximate 45 degrees relative to the diameter of the tire body 1 and the reinforcing ribs 3 in the outer row of holes 22 are arranged at approximate minus 45 degrees relative to the diameter of the tire body 1, so that when the tire rotates, the reinforcing ribs 3 are close to the rotating direction of the tire body 1, the elasticity and the strength of the tire are effectively reinforced, the contact between the tire body 1 and the ground is reduced, the friction is decreased and the driving force is decreased; the reinforcing ribs 3 are elastic pieces which are connected with the two sides of the through holes 2, or can be rubber blocks which are integrally molded with the tire body 1; the reinforcing ribs 3 are arranged at the positions of the middle sections of the through holes 2, i.e., the reinforcing ribs 3 are elastic pieces which are arranged at the middle sections in the through holes 2, as shown by the FIG. 5.

Embodiment II: as shown by the FIG. 6, the hollowed-out non-pneumatic tire with the reinforcing ribs is characterized in that the length of the reinforcing ribs 3 in the through holes 2 in the tire body 1 is equal to the length of the through holes 2, i.e., the reinforcing ribs 3 are elastic pieces which penetrate through the through holes 2 and have length being equal to the length of the through holes 2, and other arrangements are as same as that in the embodiment I.

Embodiment III: as shown by the FIG. 7 and the FIG. 8, the hollowed-out non-pneumatic tire with the reinforcing ribs is characterized in that the reinforcing ribs 3 in the tire body 1 are arranged in the through holes 2 and are in parallel with the diameter of the tire body; other arrangements are as same as that in the embodiment I.

Embodiment IV: as shown by the FIG. 9 and the FIG. 10, the hollowed-out non-pneumatic tire with the reinforcing ribs is characterized in that the reinforcing ribs 3 in the inner row of holes 21 and the outer row of holes 22 in the tire body 1 are distributed at a consistent angle and in the same direction; similarly, as shown by the FIG. 11, the reinforcing ribs 3 in the inner row of holes 21 and the outer row of holes 22 are distributed at same spacing angles and in opposite directions; other arrangements are as same as that in the embodiment I.

What is claimed is:

1. A hollowed-out non-pneumatic tire with reinforcing ribs comprises a tire body (1) that includes a row or rows of through holes (2) and reinforcing ribs (3), wherein the through holes (2) consist of an inner row of holes (21) and an outer row of holes (22), each hole of the inner row of holes (21) is arranged at a corresponding position between every two holes of the outer row of holes (22) to form an inverted-triangle structure, and the reinforcing ribs (3) in the inner row of holes (21) and the outer row of holes (22) are distributed at a consistent angle and in opposite directions.

2. The hollowed-out non-pneumatic tire according to claim 1 wherein the reinforcing ribs (3) are arranged in the through holes (2) and are in parallel with the diameter of the tire body (1).

3. A hollowed-out non-pneumatic tire with reinforcing ribs comprises a tire body (1) that includes a row or rows of through holes (2) and reinforcing ribs (3), wherein the through holes (2) consist of an inner row of holes (21) and an outer row of holes (22), each hole of the inner row of holes (21) is arranged at a corresponding position between every two holes of the outer row of holes (22) to form an inverted-triangle structure, and the reinforcing ribs (3) in the inner row of holes (21) and the outer row of holes (22) are distributed at a consistent angle and in same directions.

4. The hollowed-out non-pneumatic tire according to claim 3, wherein the reinforcing ribs (3) are arranged in the through holes (2) and are in parallel with the diameter of the tire body (1).

* * * * *